Patented Oct. 18, 1938

2,133,691

UNITED STATES PATENT OFFICE 2,133,691

REFINING OF OILS

Alfred W. Francis, Woodbury, N. J., assignor to Socony-Vacuum Oil Company, Incorporated, New York, N. Y., a corporation of New York No Drawing. Application June 27, 1936, Serial No. 87,764

3 Claims. (Cl. 196—13)

This invention relates to the refining of petroleum, and has to do particularly with the refining of petroleum fractions by processes of selective solvent extraction.

An example of the type of process with which this invention is concerned is that of fractionation as between "paraffinic" and "naphthenic" compounds of like boiling range, but of different chemical and physical characteristics, to effect a separation of the compounds of a "paraffinic" nature from the compounds of a "non-paraffinic" or "naphthenic" nature by means of a selective solvent showing different solvent powers for the two classes of hydrocarbons.

The effectiveness of such a fractionation or separation operation as that above described, may be measured, and is measured herein, by the viscosity-gravity-constant or so-called V. G. C. This viscosity-gravity-constant, proposed by Hill and Coates, Ind. and Eng. Chem. 1928, page 641, is a valuable indication of the "paraffinic" nature of an oil fraction, since the said V. G. C. value indicates increasing freedom from constituents highly "naphthenic" with decrease in numerical value of the constant. The V. G. C. for present-day lubricants of Pennsylvania origin, (not solvent refined) is around 0.800 to 0.830, with similar lubricant fractions from other sources ranging up to 0.900.

An important object of this invention is a novel method for the separation of petroleum fractions of similar boiling points, etc., but of differing chemical characteristics, by taking advantage of their selective solubilities in liquid solvents modified by the presence of inorganic salts.

It is a further object of this invention to provide novel refining agents for the above purposes, and to improve known liquid selective solvent agents for this purpose, and to provide a process for using these novel and improved selective solvent agents.

One object of this invention is to provide a process of refining petroleum lubricant stocks which is applicable generally to any petroleum lubricant oil stock which contains fractions of good lubricating value, but also contains asphaltic and/or naphthenic matter to produce therefrom a refined lubricating oil of high quality having a good viscosity-gravity-constant and other desirable qualities.

A most important object of this invention is to provide a process of this nature which is adaptable for controlling the effectiveness and selectivity of said selective solvent agents, wherein the control is effected by modification of the selective solvent power of said liquid solvents by dissolving therein different or varying amounts of appropriate inorganic compounds.

The most important advantage of such a process probably consists in the discovery that the selectivity of normally poor solvents not only may be increased to a very desirable degree, but that a great flexibility of processing is thereby provided, since concentrations of the inorganic compound in the solvent may be varied to suit any desired extraction temperature.

Examples of the modified solvent reagents or solutions which may be thus used, are solutions of the chlorides of cobalt, nickel, mercury (ic), and lithium in pyridine, lithium iodide or bromide in pyridine, lithium acetate in pyridine, calcium nitrate in pyridine, lithium chloride, bromide, or iodide in butyl alcohol, isoamyl alcohol, tertiary amyl alcohol, or ethyl alcohol, solutions of lithium chloride, bromide, or iodide in acetone, solutions of zinc chloride in ethyl acetate, ethyl ether, or dimethyl aniline, solutions of lithium chloride, calcium nitrate, cobalt chloride, mercuric chloride, zinc chloride, lithium bromide, lithium iodide, or lithium acetate in picoline, solutions of lithium chloride in cresylic acid, solutions of mercuric chloride in butyl cellosolve, solutions of perchlorates in some organic solvents, and solutions in acetone of mercuric chloride or of the sulphocyanates of sodium, potassium or ammonium.

In general any combination of a selective solvent and salt is effective in which the salt dissolves in the solvent to a sufficient extent to affect the selectivity of the solvent, provided the salt is substantially non-reactive to oil and solvent and remains in solution in substantial amounts in the presence of oil. Specific examples of suitable salt-solvent combinations which I have found, up to the present, to be useful for this purpose, are the solutions of lithium chloride, bromide, or iodide, or of calcium nitrate in pyridine or picoline and combinations thereof, provided they are mutually inert.

To show the effectiveness of these salt-solvent or modified solvent reagents for the purposes indicated, an example is here noted wherein an oil was extracted with four times its volume of a 5% solution (about ⅖ saturated) of lithium chloride in pyridine at 100° C. The resulting two layers were separated. The upper or oil layer was then cooled to about 25° C., resulting in the separation of an additional extract layer which was added to the original solvent layer. The oil layer contained some pyridine, which was removed by distillation, (leaving only a trace of lithium chloride), leaving a raffinate of increased value, as shown in the tabular data inserted below. The extract layer was distilled to separate the pyridine therefrom and the oil removed from the residual salt by decantation.

In a second example, another portion of the same oil stock was treated twice successively with two volumes each of a 4% (about half saturated), solution of calcium nitrate in pyridine at 50° C. The lower layer was withdrawn, distilled, and decanted as above to recover the pyridine and salt. The upper layer, or raffinate, was heated to remove pyridine by distillation.

The properties of the original oil and of the two raffinates are shown in the following table:

|  | Stock | LiCl raffinate | Ca(NO$_3$)$_2$ raffinate |
|---|---|---|---|
| Yield | | 53% | 52% |
| Specific gravity at 37.8° C | 0.910 | 0.8911 | 0.8905 |
| Saybolt Universal viscosity: | | | |
| At 37.8° C | 380″ | 404″ | 423″ |
| At 99.1° C | 54.7″ | 59.2″ | 60.3″ |
| Viscosity Index | 82 | 102 | 102 |
| Viscosity-gravity-constant | 0.842 | 0.828 | 0.826 |

It will be noted that the treatment resulted in a greatly improved raffinate. The two extractions are about equally efficient, but it should be observed that the calcium nitrate-solvent procedure involved a double extraction and that the lithium chloride-solvent procedure involved a higher temperature, which permitted a higher molar concentration of the salt. It should be noted also that if pyridine alone is used as the selective solvent, a temperature of below 0° C. is ordinarily necessary to cause separation into two layers, and the improvement of the raffinate under these conditions is very much less.

Calcium nitrate in pyridine cannot be used at much higher concentration or temperature than shown above without precipitation of the salt, resulting in the mixing of the two layers. Lithium chloride in pyridine can be used up to about 120° C. and 7% concentration, with some increase in selectivity of the selective solvent.

The salt, solvent, concentration and temperature chosen should be such that the salt remains in solution in the solvent under conditions of treatment, as pointed out hereinbefore.

In the following claims, the term "solvent refining" is used to designate the fractionation of petroleum fractions to separate constituents of varying chemical properties by means of a solvent having selective solvent power for one of the classes of constituents.

I claim:

1. In the refining of petroleum fractions by means of a selective solvent, without substantial chemical change of oil constituents, the method which comprises the following steps: dissolving in said solvent a small amount of a solvent-soluble inorganic salt selected from the group of solvent-soluble salts consisting of lithium chloride, lithium bromide, lithium iodide, lithium acetate, the said selective solvent being selected from the group of selective solvents consisting of pyridine and picoline, mixing a sufficient amount of the modified solvent with oil to permit the formation of two oil-containing phases, effecting separation into a paraffinic raffinate phase and a naphthenic extract phase, separating the phases, and recovering solvent-free, salt-free oil from the separated phases.

2. In the method of the refining of petroleum fractions by means of a selective solvent comprising pyridine, the steps which comprise dissolving lithium chloride in the pyridine, mixing the pyridine solution of lithium chloride with the oil to be refined, effecting the formation of a paraffinic raffinate and a naphthenic extract phase within the mixture thus obtained, separating the said phases, and freeing the raffinate phase of solvent and salt to form a refined oil of greater paraffinicity.

3. In the method of solvent refining lubricant oils by means of a selective solvent comprising pyridine, the steps which comprise dissolving in the pyridine about 5% of lithium chloride, mixing the pyridine solution of lithium chloride with oil to be refined at a temperature of about 100° C., effecting formation of paraffinic raffinate and naphthenic extract phases from the mixture so obtained, separating the phases, and freeing the raffinate phase of solvent and salt to form a refined oil of lower viscosity-gravity-constant.

ALFRED W. FRANCIS.